United States Patent [19]
Higgins et al.

[11] Patent Number: 5,341,396
[45] Date of Patent: Aug. 23, 1994

[54] MULTI-RATE SPREAD SYSTEM

[75] Inventors: Robert P. Higgins; John H. Nitardy, both of Seattle, Wash.

[73] Assignee: The Boeing Company, Seattle, Wash.

[21] Appl. No.: 24,931

[22] Filed: Mar. 2, 1993

[51] Int. Cl.$^5$ .................. H04L 9/00; H04L 27/30
[52] U.S. Cl. .................................. 375/1; 380/34
[58] Field of Search ............................ 375/1; 380/34

[56] References Cited
U.S. PATENT DOCUMENTS

| | | | |
|---|---|---|---|
| 4,630,283 | 12/1986 | Schiff | 375/1 |
| 4,984,247 | 1/1991 | Kaufmann et al. | 375/1 |
| 5,103,459 | 4/1992 | Gilhousen et al. | 375/1 |
| 5,170,410 | 12/1992 | Gressier et al. | 375/1 |
| 5,204,875 | 4/1993 | Mower et al. | 375/1 |
| 5,204,876 | 4/1993 | Bruckert et al. | 375/1 |

*Primary Examiner*—Salvatore Cangialosi
*Attorney, Agent, or Firm*—Christensen, O'Connor, Johnson & Kindness

[57] ABSTRACT

Apparatus and a method for transmitting a direct sequence, spread spectrum communication system signal. A transmitter (10) that receives a variable data rate information bearing input signal from a digital data source (12) includes a forward error correction encoder (80) that provides redundancy and an interleaver (82) that rearranges the input data. The forward error correction encoder and interleaver minimize the effect of errors that arise in the propagation of the transmitted signal. The output of the interleaver is applied to the input of a Hadamard encoder (84), which converts data words from the interleaver into one of N orthogonal codes, producing a Hadamard signal that varies at a bit rate that changes as the data rate of the information bearing signal varies. A pseudorandom number code generator (16) produces a code signal comprising a pseudorandom sequence of chips supplied at a constant chip rate. The Hadamard signal is input to a direct sequence (DS) modulator that modulates the information bearing signal with the code signal, using an integer number (greater than one) of chips to modulate each bit of the Hadamard signal. As the data rate of the information bearing signal varies, the number of chips per bit of the Hadamard signal is varied so as to minimize variations in the chip rate of the DS modulated signal. The transmitter is preferably combined with a receiver (29) in a transceiver. The receiver demodulates a received signal, and correlates it with a code signal from a pseudorandom number code generator (40) corresponding to the pseudorandom number code generator in the transmitter. The receiver also includes a Hadamard decoder (94), deinterleaver (96), and forward error correction decoder (98). A frequency hopping capability is optionally provided.

20 Claims, 3 Drawing Sheets

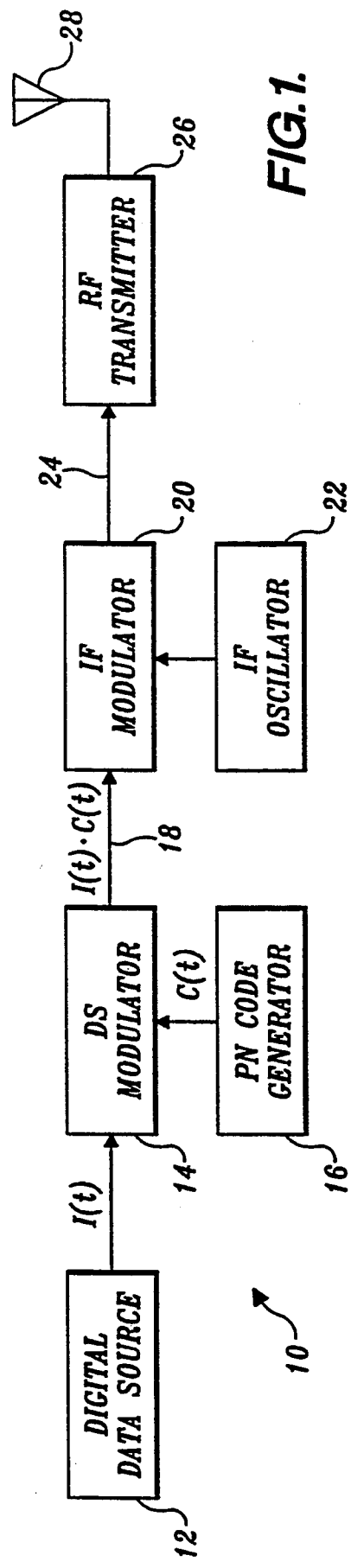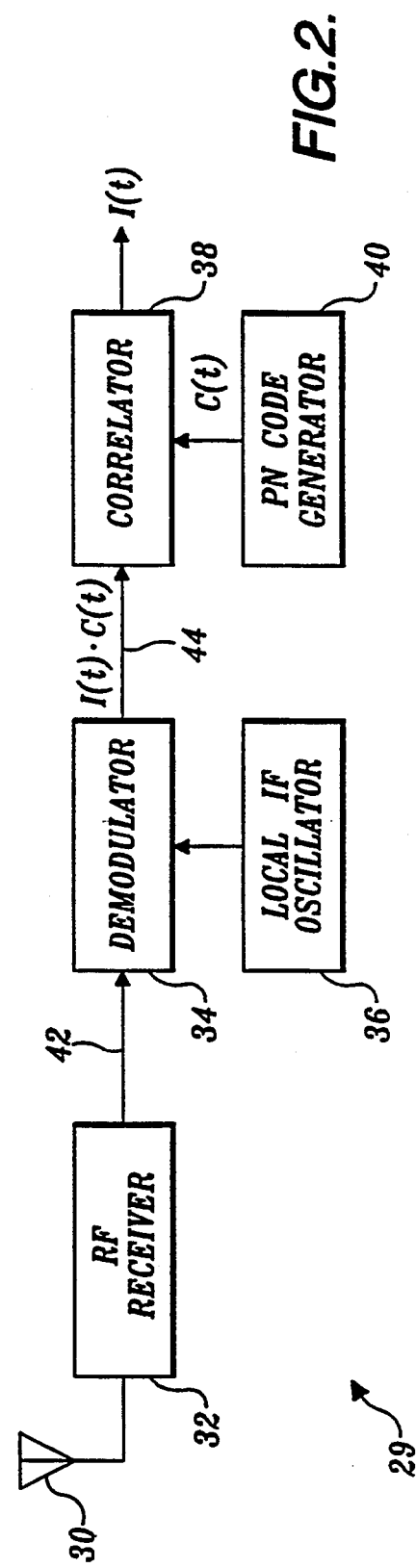

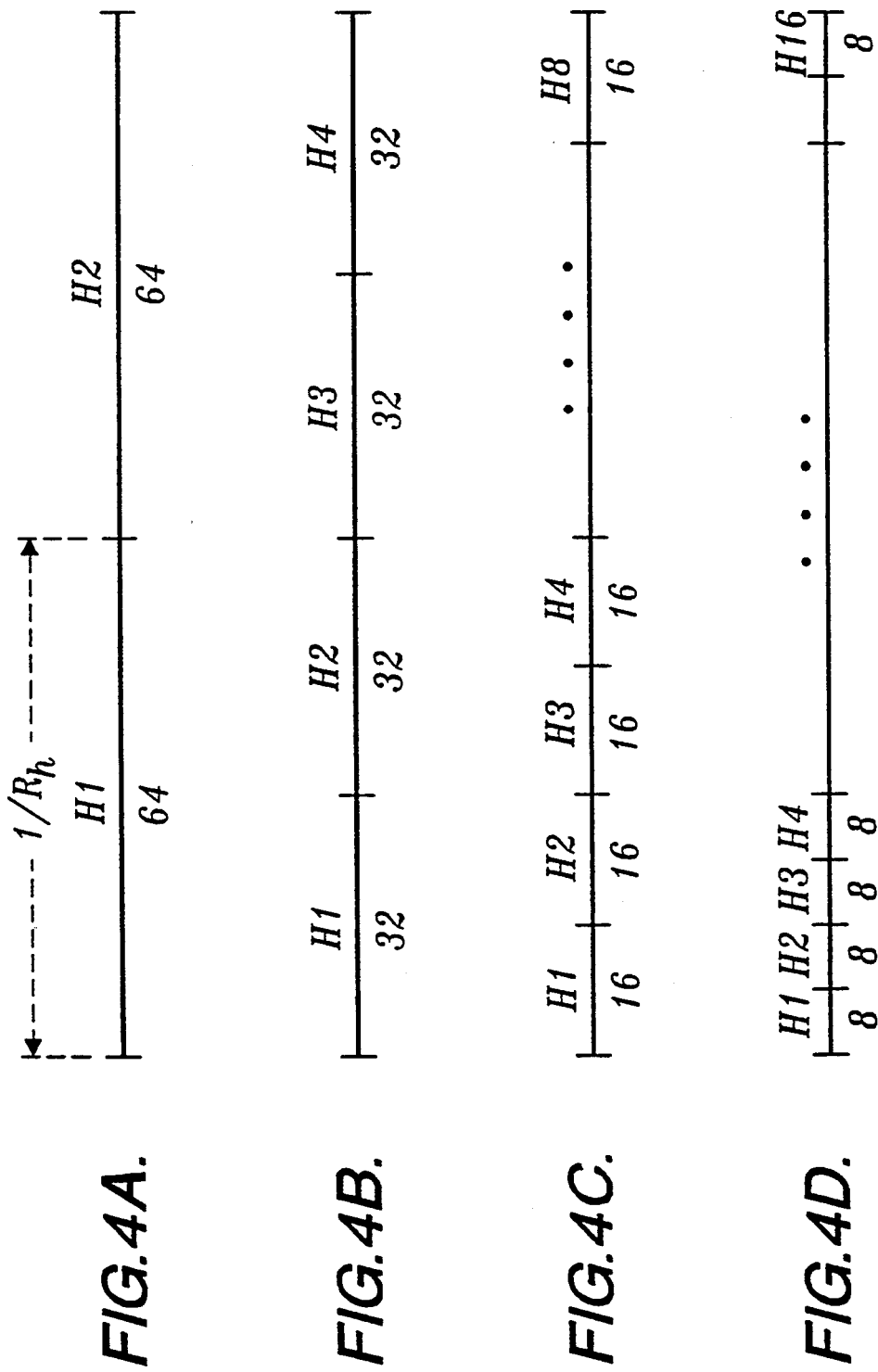

MULTI-RATE SPREAD SYSTEM

FIELD OF THE INVENTION

The present invention generally relates to spread spectrum communication systems and, in particular, to a direct sequence spread spectrum system.

BACKGROUND OF THE INVENTION

In a spread spectrum system, a transmitted signal is spread over a frequency band that is much wider than the bandwidth of the information being transmitted. Two techniques commonly used in spread spectrum systems are frequency hopping and direct sequence (DS) modulation. Frequency hopping involves shifting the carrier frequency in discrete increments, in a pattern dictated by a pseudorandom code. In direct sequence modulation, each bit of an information-bearing signal is modulated by a higher frequency, pseudorandom code signal. The modulation may simply comprise reproducing the input code signal when the information bit is one, and inverting the code signal when the information bit is zero. Each bit of the code signal, or each bit of the product signal obtained by modulating the information-bearing signal with the code signal is referred to as a "chip."

In a system using direct sequence modulation, the chip rate, i.e., the frequency of the pseudorandom code signal, is typically much higher than the bit rate of the information-bearing signal. The bandwidth occupied by the transmitted signal is directly determined by the chip rate. A receiver in a direct sequence modulated communication system includes means for producing the same pseudorandom code signal as that used by the transmitter, in the same time epoch. The code signal is employed to decode the transmitted data and extract the information-bearing signal, even in the presence of noise or jamming.

Applications of spread spectrum systems are various, depending upon characteristics of the codes being employed for band spreading and other factors. In direct sequence systems, for example, where the code is a pseudorandom sequence, the transmitted signal acquires the characteristics of noise, making the transmission indiscernible to any eavesdropper who is incapable of decoding the transmission.

In certain kinds of spread spectrum communication systems, the data to be transmitted through the system is provided at two or more different data rates. In such a system, it is necessary to either vary the modulation rate of the transmitter while maintaining the spreading ratio, or transmit null data to act as filler at the lower data rates. Both options have certain disadvantages. The variations in the modulation of the transmitted signal can be more readily detected by an eavesdropper, thereby decreasing the security of the communication system. On the other hand, transmitting null data at low data rates increases the amount of energy required for the transmission. Therefore, it would be advantageous to provide a technique for use in a spread spectrum system that does not require this trade-off.

SUMMARY OF THE INVENTION

The present invention provides a transmitter for a direct sequence, spread spectrum communication system. The transmitter receives an information-bearing signal at a variable data rate, and includes means for producing a code signal comprising a pseudorandom sequence of chips at a chip rate, and DS modulation means for modulating the information-bearing signal with the code signal, to produce a DS modulated signal. In the modulation process, each bit of the information-bearing signal is modulated with N chips of the code signal, N being an integer greater than 1. Finally, the transmitter includes timing means for causing the value of N to vary as the data rate varies. In a preferred embodiment, the timing means cause the value of N to vary such that the chip rate of the DS modulated signal is substantially constant as the data rate varies. In this system, a change in the data rate does not produce a detectable change in the modulation characteristics of the transmitted signal, thereby enhancing the security of the system. However, at low data rates, the transmitted power may be decreased without loss of communication.

A further aspect of the present invention is a method for producing a direct sequence, spread spectrum communication system signal. The method comprises steps that generally correspond to the functions of the elements of the system described above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a block diagram of a transmitter for a DS modulated spread spectrum communication system;

FIG. 2 is a block diagram of a receiver for such a communication system;

FIGS. 4A–4D are timing diagrams showing the variation of the chips per bit as the data rate changes.

DETAILED DESCRIPTION OF THE PREFERRED EMBODIMENT

Figure 3:
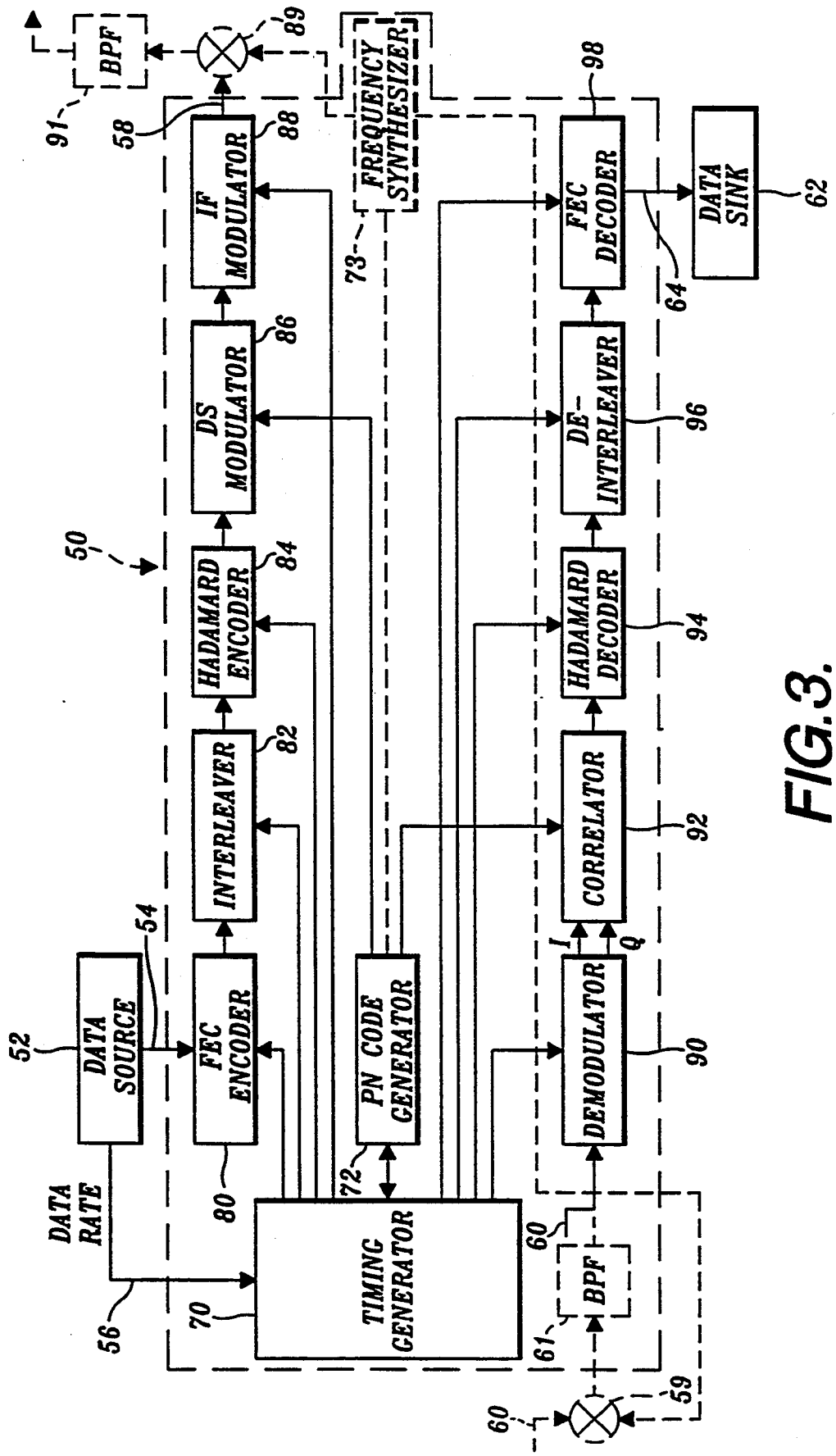
FIG. 3 is a block diagram of a spread spectrum transceiver utilizing the present invention.

FIGS. 1 and 2 illustrate a typical arrangement for a direct sequence (DS), spread spectrum communication system. FIG. 1 illustrates a transmitter 10 that includes a digital data source 12, which produces the digital information-bearing signal I(t) to be transmitted. A DS modulator 14 combines the information-bearing signal with a code signal C(t) produced by a pseudorandom number (PN) code generator 16. Code signal C(t) is typically a pseudorandom binary sequence that has many of the characteristics of random noise, but which is deterministic and reproducible by intended receivers. Such signals may be produced by relatively simple circuitry employing shift registers with feedback at selected taps.

Each bit of code signal C(t) is referred to as a "chip". The number of chips per second (the "chip rate") in the code signal C(t) is chosen to be higher than the data rate (bits per second) of the information-bearing signal I(t). Because the chip rate is higher than the data rate, the output of DS modulator 14, comprising the DS modulated signal I(t)·C(t), has a broader frequency spectrum than information-bearing signal I(t). The number of chips used to modulate each bit of signal I(t) represents a fundamental design parameter of the system, since it represents the degree by which the bandwidth of the information-bearing signal will be spread for transmission.

The DS modulated signal 18 is input to an IF modulator 20, and modulated onto an IF carrier produced by an IF oscillator 22. The result is an IF signal 24 that is input to an RF transmitter block 26. The RF transmitter block converts the IF signal to a suitable transmission band, and transmits the signal via an antenna 28. In general, IF modulator 20 may employ virtually any type of signal modulation, such as phase shift, frequency shift, and minimum shift keying (MSK) modulation. In phase shift modulation, each chip of DS modulated signal 18 controls the phase of the IF carrier, while in frequency shift modulation, each chip controls the frequency of the IF carrier. In MSK modulation, the DS modulated signal is separated into even and odd chip sequences, and the even and odd chip sequences are then modulated onto a pair of IF carriers that are in quadrature relationship with one another. Of these three modulation techniques, MSK modulation is particularly efficient and is preferred, although other modulation techniques can be used.

In a system that also included frequency hopping, RF transmitter block 26 uses a series of different RF carrier frequencies for transmitting the data. The RF transmitter block hops between successive carrier frequencies at a predetermined hop rate, with the frequency selection at each hop also being controlled by a pseudorandom code. For simplicity, frequency hopping functions have been omitted from FIGS. 1 and 2, but are described later in connection with a transceiver embodiment shown in FIG. 3, in which optional components including a frequency synthesizer 73, mixers 59 and 89, and band pass filters (BPFs) 61 and 92 that are generally required to implement frequency hopping, are all indicated with dash lines to show that they are optional. These optional components can also be included in the RF transmitter and RF receiver disclosed in FIGS. 1 and 2 to implement frequency hopping in the embodiment of the present invention illustrated therein.

FIG. 2 illustrates an RF receiver 29 for receiving the data transmitted by the RF transmitter of FIG. 1. The RF receiver includes an antenna 30, an RF receiver block 32, a demodulator 34, a local IF oscillator 36, a correlator 38, and a PN code generator 40. The RF signal is received by antenna 30 and down-converted by RF receiver block 32 to produce an IF signal 42. Demodulator 34 receives the IF signal, and essentially inverts the modulation produced by IF modulator 20 in the transmitter, to produce DS modulated signal 44. DS modulated signal 44 is then input to correlator 38 that compares the incoming waveform to the code produced by PN code generator 40. This code is identical to the code produced by PN code generator 16 in the transmitter. The output of correlator 38 is the information-bearing signal I(t).

PN code generators 16 and 40 produce pseudorandom sequences that are characterized by a "length", the length being the number of bits produced by the generator before the bit sequence begins repeating. In a typical application, the code sequences are quite long, such that the bit sequence repeat time is measured in hours or days. The receiver includes synchronization circuitry (not shown) for synchronizing code generator 40 with the code produced by code generator 16. The synchronization circuitry is omitted from FIG. 2 for simplicity, and because synchronization per se does not form part of the present invention.

A spread spectrum communication system may consist of a single transmitter and a single receiver. However, more typically, such a system comprises a network of transceivers, each capable of selectively acting as both a transmitter and a receiver. In any system, but particularly in more complex systems, it may be necessary for a given transceiver to be able to accept and transmit data from different sources that provide their data at different bit rates. For example, a transceiver may receive data from a computer and from a voice digitizer, at different data rates, and be required to transmit both types of information over the communication network.

In the past, when a system has required variable data rate capability, the solution has been to design the system for the highest data rate that will be required, and to handle lower data rates by transmitting null or padding data. Thus, for example, during intervals when there is no data to be transmitted, the transmitter continues to transmit null bits, i.e., the code signal or its inverse, to enable receivers to maintain synchronization. Unfortunately, this practice results in inefficiency, since the amount of power required to communicate between a given transmitter and receiver is directly proportional to the data rate. As the rate of the information-bearing signal decreases, it is desirable to decrease the amount of power required to transmit the information.

One potential approach to the variable data rate problem is to vary the clock rates of the transmitters and receivers, while maintaining the spreading ratio, i.e., to use lower transmission rates during periods when the data is supplied for transmission at lower rates. The resulting variable bandwidth would require the extra complexity of variable bandwidth filters in the RF sections of the transmitter and receiver. It would therefore be desirable to produce an RF communication system that is capable of handling variations in the data rate without changing the externally detectable modulation parameters.

The present invention addresses the problems described above by varying the number of chips per bit of the information-bearing signal, as a function of the data rate of the information signal. The significance of this feature is explained in detail below. A block diagram of a transceiver 50 constructed in accordance with the invention is set forth in FIG. 3. Although this diagram includes a number of elements that do not form a part of the invention per se, they are shown in order to provide a more complete description of the typical environment in which the invention will be applied.

The illustrated transceiver is capable of acting as either a transmitter or a receiver of direct sequence, spread spectrum signals. When acting as a transmitter, transceiver 50 receives an information signal from a data source 52 via a line 54. The transceiver also receives a data rate signal from the data source via a line 56, the data rate signal indicating the bit rate of the information signal on line 54. The transceiver processes the information signal, as described below, to produce an IF output signal (IF OUT) on a line 58 that is then up-converted and transmitted to other transceivers in the network. When acting as a receiver, transceiver 50 accepts an IF input signal on a line 60 (identified by a solid tag line in the Figure), and processes the IF input signal (IF IN) to reproduce the information signal that is then coupled to a data sink 62 via a line 64.

Transceiver 50 includes components common to both the transmitter and receiver functions, as well as components dedicated to a single one of these functions. The common components include a timing generator 70 and a pseudorandom number (PN) code generator 72. Timing generator 70 controls and synchronizes the operation of the transceiver, in response in part to the data rate signal received from the data source via line 56. The function of timing generator 70 is further discussed below. PN code generator 72 produces the codes used to spread and despread the transmitted and received signals, in a manner similar to that described in connection with FIGS. 1 and 2.

The transmission path of transceiver 50 comprises a forward error correction (FEC) encoder 80, an interleaver 82, a Hadamard encoder 84, a DS modulator 86, and an IF modulator 88. Each of these components, with the exception of DS modulator 86, operates in response to a timing signal produced by timing generator 70. DS modulator 86, on the other hand, operates in response to the code signal received from code generator 72, in addition to being responsive to the timing generator. These components are connected in a linear fashion, with FEC encoder 80 receiving the information signal from data source 52, and IF modulator 88 producing the IF output signal on line 58.

The receiver path of transceiver 50 comprises a demodulator 90, a correlator 92, a Hadamard decoder 94, a deinterleaver 96, and an FEC decoder 98. Correlator 92 operates in response to a PN code signal received from PN code generator 72, and along with the remaining components, operates in response to timing signals produced by timing generator 70.

In general, the purpose of FEC encoder 80 is to add redundancy to the information signal, so that errors that occur during transmission can be detected and corrected by the FEC decoders in other transceivers in the communication network. A simple example of an error detection code is a parity bit. A parity bit is an additional bit added to a multibit binary word, in order to make the word as a whole, including the parity bit, have some characteristic, such as an even number of one bits (even parity) or an odd number of one bits (odd parity). If the receiver detects a word with the wrong number of one bits, it knows that an error has occurred. More sophisticated error techniques permit both detection and correction of errors, some permitting in more than one bit at a time to be corrected. Examples of suitable error correction codes are orthogonal trellis codes and Reed-Solomon codes.

At this point, it might be helpful to define some of the parameters that determine the timing relationship between the various components of the system. These relationships are based on the following identities:

| | | |
|---|---|---|
| Rb = Information bit rate (from data source 52) | | (1a) |
| Rc = FEC encoder 80 output symbol rate | | (1b) |
| Rh = Hadamard encoder 84 output rate | | (1c) |
| Rd = DS chip rate | | (1d) |
| Rfh = frequency hop rate | | (1e) |

Using the preceding parameters, other values are defined as a function of the parameters, as follows:

| | |
|---|---|
| Rc = Ncb*Rb | Ncb is the number of FEC code symbols per input bit, a rational number that is fixed at the time of the system design by selection of the FEC code. |
| Rh = Nhc*Rc | Nhc is the number of Hadamard sequence bits per code symbol and is an integer power of 2 and ≧ the number of symbols in the code alphabet (fixed at the time of system design). |
| Rd = Ndh*Rh | Ndh is the number of direct sequence chips per Hadamard bit and is an integer ≧ 1 (normally much greater than 1). |
| Rh = Nbfh*Rfh | Nbfh is the number of Hadamard bits transmitted in each frequency hop interval and is an integer multiple of Nhc. Because coherence is maintained only over a hop interval, all of the Hadamard bits for a code symbol have to be in a single hop interval. |
| Rd = Ndfh*Rfh | Ndfh is the number of DS chips per frequency hop and is an integer ≧ 1 (usually much greater than 1). |

As noted above, some of the parameters are defined at the time that the system is designed and are not variable during operation of the system. The number of code symbols per input data bit, Ncb, is fixed by choice of the FEC code. The number of Hadamard bits is defined by the number of alphabet symbols produced by the FEC encoder. Further, the number of Hadamard bits is determined by the number of alphabet symbols produced by Hadamard encoder 84, and the number of orthogonal signal produced by the Hadamard encoder has to be at least as large as the number of the symbols in the FEC encoder alphabet. Since the complexity of the system is largely dependent upon the size of the orthogonal signal set, it is desirable to keep the number of orthogonal signals as small as possible. Accordingly, Nhc is chosen at design time and is fixed, so that the frequency hop rate, Rfh, and the DS chip rate, Rd, are held constant. As a result, the parameters, Ndh and Nbfh, are allowed to vary as the data rate, Rb varies, and the following two equations define the constraints that determine how these parameters vary:

$$Ndh = \frac{Rd}{Rb*Ncb*Nhc} \quad (2)$$

$$Nbfh = \frac{Rb*Ncb*Nhc*Ndfh}{Rd} \quad (3)$$

The purpose of interleaver 82 is to alter the sequence of the data to be transmitted. A typical interleave scheme is a row-column technique that can be pictured by imagining a matrix of memory locations that are filled in row order and emptied in column order. Thus, if the matrix is 3 by 3, and if the numbers 1, 2, 3, 4, 5, 6, 7, 8, and 9 represent the input data sequence, then the output sequence would be 1, 4, 7, 2, 5, 8, 3, 6, and 9. Interleaving is useful because jamming, noise and other phenomena that may disrupt transmission typically will affect a contiguous group of bits of the transmitted signal. However, if the information has been interleaved, then the corrupted data may be spread over a number of binary words. If the number of affected bits per word is sufficiently low, then the errors can be detected and corrected by error correction techniques. Interleaving thus decreases the chance that a given word or unit of data will have too many errors to allow error correction to be performed.

Hadamard encoder 84 receives "symbols," i.e., multibit data words, from interleaver 82, and converts each symbol into one of N orthogonal codes. In general, the purpose of this step is to make the different data symbols as different as possible from one another, to decrease the likelihood that noise or other interference could change one symbol into another. This may be clarified by a simple visual analogy. The symbols E and F are relatively non orthogonal in a visual sense, because a small change could convert one symbol into the other. On the other hand, the symbols X and O are highly orthogonal, since they contain essentially no common visual elements, and it would therefore be easier to distinguish from one another in the presence of visual noise (e.g., in a poor photocopy). Thus the step of Hadamard encoding can be regarded as a process of converting the data to be transmitted into symbols that will not be readily confused with one another, even if some bits of a symbol are altered during transmission.

A more mathematical definition of orthogonality is as follows. Two signals x(t) and y(t) are orthogonal if they have a common period, T, and if the following condition is satisfied:

$$\int_0^T x(t)y(t)dt = 0 \tag{3}$$

The Hadamard signal produced by Hadamard encoder 84 forms the input to DS modulator 86 that operates in a manner similar to DS modulator 14 of FIG. 1. Thus, the Hadamard signal comprises the information-bearing signal I(t) of FIG. 1. Typically, DS modulator 86 operates as a bi-polar multiplier. In such an approach, the DS modulated signal is equal to the code signal when the Hadamard bit is a 1, and is the inverse of the code signal when the Hadamard bit is −1.

The DS modulated signal is input to IF modulator 88. In general, many different types of modulation can be used by the IF modulator to produce the IF signal. Suitable modulation approaches include binary phase shift keying (BPSK), MSK, and continuous phase modulation (CPM). In general, for baseband modulation, the modulator must have a spectral null at zero frequency (no DC component). As described below, in a preferred embodiment, the DS modulated signal has a constant bit or chip rate. In such a case, the modulation form does not affect the multi-rate operation of the system.

In accordance with the present invention, the output of code generator 72 is provided at a constant chip rate $R_c$ that does not vary as a function of the data rate. Hadamard encoder 84, however, produces a Hadamard signal at a bit rate $R_h$ that varies as the data rate varies. It is desired that the DS modulated signal produced by S modulator 86 change as little as possible, and preferably not at all, as the data rate changes. In order to minimize variations in the data rate of the DS modulated signal with variations in the data rate of the information-bearing, the present invention varies the number of chips used to encode each Hadamard bit (i.e., each bit of the Hadamard signal) as the data rate varies.

The concept of varying the number of chips per Hadamard bit as the data rate varies is illustrated in FIGS. 4A–4D. In FIG. 4A, the symbols H1 and H2 above the time line represent two "Hadamard bits," i.e., two bits output by Hadamard encoder 84. If the Hadamard rate is $R_h$, then the time period occupied by one Hadamard bit is $1/R_h$, as indicated in FIG. 4A. The figures below the time line in FIG. 4A represent the number of chips used to spread or modulate each Hadamard bit. In this example, 64 chips are used for each Hadamard bit.

In FIG. 4B, it is assumed that the data rate, and therefore, the Hadamard rate, has doubled, i.e., there are now twice as many Hadamard bits per unit time. In this case, the transceiver preferably uses 32 chips to encode each Hadamard bit, so that the output modulation remains unchanged, i.e., there are still a fixed number of chips per unit time. FIGS. 4C and 4D illustrate the variation of the chips per Hadamard bit as a function of data rate for two additional doublings of the data rate. In FIG. 4C, the data rate is double that illustrated in FIG. 4B, and there are sixteen chips per Hadamard bit. In FIG. 4D, the data rate has again doubled, and there are now eight chips per Hadamard bit.

In an embodiment of the present invention that includes frequency hopping, the IF output signal on line 58 is combined in mixer 89 with the output signal from frequency synthesizer 73. The frequency of the signal provided by the frequency synthesizer is changed at a fixed interval (hopping rate), and the value of this frequency is pseudo-randomly determined by the PN signal produced by PN code generator 72. The resulting random carrier frequency modulated signal is band pass filtered by optional BPF 91. Similarly, when receiving a frequency hopping type DS signal, the IF input signal on line 60 is combined with the pseudo-random number signal produced by PN code generator 72 in optional mixer 59 and band pass filtered by a BPF 61 to recover the modulated signal for demodulation.

If frequency hopping is employed, certain constraints arise in the use of the present invention. For example, at all data rates, there should be an integer number of data symbols in each frequency hop interval, i.e., each time period during which a particular carrier frequency is used. By way of example, the relationship between the number of Hadamard bits per frequency hop internal and the number of PN code bits per Hadamard bit may be selected as follows:

| FEC Symbols Per Hop Interval | Hadamard Bits Per Hop Interval | PC Code Bits Per Hadamard Bit |
| --- | --- | --- |
| 1 | 8 | 128 |
| 2 | 16 | 64 |
| 4 | 32 | 32 |
| 8 | 64 | 16 |
| 16 | 128 | 8 |
| 32 | 256 | 4 |
| 64 | 512 | 2 |

The operation of the interleaver and deinterleaver may be varied as a function of the number of Hadamard bits per hop interval. In particular, in the case in which there is only one Hadamard bit per hop interval, there is no need to interleave, because consecutive bits will be transmitted at different carrier frequencies. Thus, in a row-column interleaver, the number of rows can be reduced to one at the lowest data rate. As the data rate and Hadamard bits per hop interval increase by factors of two, then the number of rows in the interleaver increase in the same ratio.

While preferred embodiments of the invention have been illustrated and described, it will be appreciated that various further changes can be made without departing from the scope of the invention. For example, it will be appreciated that the concept of varying the number of chips/bit could readily be applied directly to the information signal itself, rather than to the Hadamard encoder output. Thus the invention applies to any system in which an information-bearing signal is DS modulated by a higher frequency code signal.

The embodiments of the invention in which an exclusive property or privilege is claimed are defined as follows:

1. A transmitter for a direct sequence, spread spectrum communication system, the transmitter comprising:
   (a) means for receiving an information-bearing input signal at a variable data rate;
   (b) means for producing a code signal comprising a pseudorandom sequence of chips at a chip rate;
   (c) DS modulation means for modulating the information-bearing signal with the code signal to produce a DS modulated signal such that each bit of the information-bearing signal is modulated with N chips of the code signal, N being an integer greater than 1; and
   (d) timing means for causing the value of N to vary as the variable data rate varies, such that the chip rate of the DS modulated signal is substantially constant as the data rate varies.

2. The transmitter of claim 1, wherein the timing means cause the value of N to vary as the data rate varies such that the chip rate of the DS modulated signal is substantially constant as the data rate changes.

3. The transmitter of claim 1, further comprising:
   (a) an error correction encoder having an input coupled to receive the information-bearing input signal and an output from which a signal is supplied having increased redundancy relative to the information bearing input signal; and
   (b) an interleaver coupled to the output to receive the signal from the error correction encoder, said interleaver having an output from which a rearranged sequence of data comprising the signal from the error correction encoder output is supplied.

4. The transmitter of claim 3, further comprising a Hadamard encoder having an input that is coupled to the output of the interleaver, and an output that conveys a unique binary sequence orthogonal signal set determined as a function of the signal from the output of the interleaver.

5. The transmitter of claim 4, wherein the timing means comprise a timing generator that provides timing signals for the DS modulation means, the error correction encoder, the interleaver, and the Hadamard encoder.

6. The transmitter of claim 4, wherein the error correction encoder produces a predetermined number of code symbols per each input bit of the information bearing input signal, and wherein an output rate of the unique binary sequence orthogonal signal set conveyed on the output of the Hadamard encoder varies as a function of the variable data rate of the information bearing input signal.

7. The transmitter of claim 1, further comprising frequency hopping means, coupled to receive an output signal from the DS modulation means, for pseudorandomly shifting a frequency of a carrier frequency with which the DS modulated signal is transmitted over frequency hopping intervals.

8. The transmitter of claim 7, wherein the frequency hopping means are coupled to the means for producing a code signal and provide an integer number of Hadamard bits in each frequency hopping interval, said integer number being determined as a function of the N chips of the code signal.

9. A direct sequence, spread spectrum communication system, comprising:
   (a) a transmitter having:
      (i) a transmit pseudorandom number code generator that produces a code signal comprising a pseudorandom sequence of chips at a chip rate;
      (ii) a DS modulator for modulating a variable rate information bearing input signal comprising a plurality of bits with the code signal to produce a DS modulated signal, such that each of the plurality of bits of the information-bearing signal is modulated with N chips of the code signal, N being an integer greater than 1; and
      (iii) timing means for causing the value of N to vary as a rate of the information bearing input signal varies; and
   (b) a receiver having:
      (i) a receive pseudorandom number code generator that produces a code signal corresponding to the code signal of the transmit pseudorandom number code generator; and
      (ii) correlator means, coupled to the receive pseudorandom number code generator, for correlating a demodulated signal received from the transmitter to recover the information bearing input signal.

10. The direct sequence, spread spectrum communication system of claim 9, wherein the transmitter and the receiver are disposed at separate sites.

11. The direct sequence, spread spectrum communication system of claim 9, wherein the transmitter and receiver comprise a transceiver.

12. The direct sequence, spread spectrum communication system of claim 9, wherein the timing means cause the value of N to vary as the rate of the information bearing input signal varies, such that the chip rate of the DS modulated signal is substantially constant as the rate of the information bearing input signal changes.

13. The direct sequence, spread spectrum communication system of claim 9, wherein said transmitter further comprises:
   (a) an error correction encoder having an input coupled to receive the information-bearing input signal and an output from which a signal is supplied having increased redundancy relative to the information bearing input signal; and
   (b) an interleaver coupled to the output to receive the signal from the error correction encoder, said interleaver having an output from which a rearranged sequence of data comprising the signal from the error correction encoder output is supplied.

14. The direct sequence, spread spectrum communication system of claim 13, wherein said transmitter further comprises a Hadamard encoder having an input that is coupled to the output of the interleaver, and an output that conveys a unique binary sequence orthogonal signal set determined as a function of the signal from the output of the interleaver.

15. The direct sequence, spread spectrum communication system of claim 14, wherein the timing means comprise a timing generator that provides timing signals for the DS modulation means, the error correction encoder, the interleaver, and the Hadamard encoder.

16. The direct sequence, spread spectrum communication system of claim 9, wherein the receiver further comprises:
   (a) a Hadamard decoder having an input coupled to the correlator means, for processing a signal output from the correlator means, and having an output;

(b) a deinterleaver, having an input coupled to the output of the Hadamard decoder and an output, said deinterleaver rearranging a signal from the Hadamard decoder to de-interleave components of said signal; and (c) an error correction decoder, having an input coupled to the output of the deinterleaver, and an output coupled to a data sink, said error correction decoder eliminating redundancy in the signal to recover an information bearing signal that was transmitted, compensating for errors in said information bearing signal, as received.

17. A method for producing a direct sequence, spread spectrum communication system signal, the method comprising the steps of:

(a) receiving an information-bearing input signal at a variable data rate;

(b) producing a code signal comprising a pseudorandom sequence of chips at a chip rate;

(c) modulating the information-bearing signal with the code signal to produce a DS modulated signal such that each bit of the information-bearing signal is modulated with N chips of the code signal, N being an integer greater than 1; and (d) causing the value of N to vary as the variable data rate varies.

18. The method of claim 17, wherein the step of causing the value of N to vary comprises the step of varying the value of N as the data rate varies, such that the chip rate of the DS modulated signal is substantially constant as the data rate changes.

19. The method of claim 17, further comprising the steps of:

(a) producing a signal having increased redundancy relative to the information bearing input signal; and (b) rearranging a sequence of data comprising said signal that has increased redundancy to produce an interleaved signal.

20. The method of claim 19, further comprising the step of Hadamard encoding the interleaved signal to produce a unique binary sequence orthogonal signal set of said interleaved signal.

* * * * *